(12) United States Patent
Kakinoki

(10) Patent No.: US 8,245,187 B2
(45) Date of Patent: Aug. 14, 2012

(54) DISK ARRAY APPARATUS

(75) Inventor: Masaya Kakinoki, Tokyo (JP)

(73) Assignee: NEC Corporation, Tokyo (JP)

( * ) Notice: Subject to any disclaimer, the term of this patent is extended or adjusted under 35 U.S.C. 154(b) by 1002 days.

(21) Appl. No.: 12/211,251

(22) Filed: Sep. 16, 2008

(65) Prior Publication Data

US 2009/0077547 A1    Mar. 19, 2009

(30) Foreign Application Priority Data

Sep. 19, 2007    (JP) .................................. 2007-242200

(51) Int. Cl.
*G06F 12/00* (2006.01)
*G06F 9/44* (2006.01)

(52) U.S. Cl. ................. 717/114; 711/E12.001; 717/168; 717/172; 717/173

(58) Field of Classification Search ................. 711/114, 711/E12.001; 717/168, 172, 173
See application file for complete search history.

(56) References Cited

U.S. PATENT DOCUMENTS

| | | | |
|---|---|---|---|
| 6,782,448 B2 * | 8/2004 | Goodman et al. | 711/112 |
| 7,191,437 B1 * | 3/2007 | Coatney et al. | 717/174 |
| 7,426,633 B2 * | 9/2008 | Thompson et al. | 713/2 |

FOREIGN PATENT DOCUMENTS

| | | |
|---|---|---|
| JP | 1999353127 A | 12/1999 |
| JP | 2000330729 A | 11/2000 |
| JP | 2002318666 A | 10/2002 |

OTHER PUBLICATIONS

Japanese Office Action for JP2007-242200 issued Sep. 8, 2009.

* cited by examiner

*Primary Examiner* — Kevin Ellis
*Assistant Examiner* — Mehdi Namazi

(57) ABSTRACT

To update a firmware without stopping an operation of a disk array apparatus. The disk array apparatus includes a plurality of disk devices providing redundancy, a disk array control device, and a disk controller for controlling the disk devices individually in response to a command issued from the disk array control device. The disk array control device designates a disk device to be updated based on contents of the firmware update command for the disk device, controls firmware update for the designated disk device, disconnects the designated disk device from the host computer temporarily, sets the disk device as being in a temporary degenerate state, and, when a data write or read command is issued from a host computer for the disk device being in the temporary degenerate state, designating a different disk device to execute the command issued from the host computer by using redundancy of the disk devices.

11 Claims, 4 Drawing Sheets

DISK ARRAY APPARATUS

CROSS-REFERENCE TO RELATED APPLICATION

This application is based upon and claims the benefit of priority from Japanese patent application No. 2007-242200, filed on Sep. 19, 2007, the disclosure of which is incorporated herein in its entirety by reference.

BACKGROUND OF THE INVENTION

1. Field of the Invention

The present invention relates to a disk array apparatus, and more specifically, to a disk array apparatus in which a firmware of a disk device can be updated even when the disk array apparatus is in an operation state (being online).

2. Related Art

A disk array apparatus, in which a plurality of disk devices (hereinafter, "disk device" may be called as "HDD", including a disk controller thereof) are arranged for providing redundancy, to expand a storage capacity, increase an information transmission speed, and enhance reliability, have come into widespread use. Each of the plurality of disk devices (HDDs) performs information transmission/reception with a host computer (server) via a disk array control apparatus, and, seen from the host computer, disk devices appear as a single disk device, virtually. As a technique to realize the disk array apparatus which can provide an enlarged storage capacity, a higher transmission speed of information, and enhanced reliability, RAID (Redundant Array of Inexpensive Disks) systems have been widely employed. As a type of the RAID systems, a RAID-0 system is optimized for providing higher transmission speed with no redundancy. However, RAID-1 to RAID-5 systems are widely known to be configured to provide redundancy, with which a disk array apparatus can continue to operate even when one of the HDDs fails.

Meanwhile, in the disk array apparatus, each disk device (HDD), as well as the disk array control apparatus, is provided with a CPU (processing unit) and software for controlling the disk mechanism (hardware). This software is resident in a ROM (nonvolatile memory) and the like, organizes the control action of the hardware such as a disk mechanism portion mainly, thus the software is called as "firmware (HDD control firmware)". The firmware has a characteristic of being updated according to certain reasons, such as version-up-grade, for example.

Generally, the firmware update (referred to as "download," in many cases) is performed by the manner in which an update firmware is transferred from the disk array control apparatus to the HDD side. However, since the control action of the HDD is organized by the firmware as described above, an operation of an HDD whose firmware is to be updated have to be stopped temporarily during updating the firmware in general, and this may cause a stoppage of the disk array apparatus, and further, an interruption of service, etc.

Thus, there is proposed a system with which it is possible to download an HDD control firmware to an HDD (update the HDD) without stopping the operation of a disk array apparatus even when the operation of a disk device (HDD) is stopped (Japanese Unexamined Patent Publication 11-353127: Patent Document 1). That is, with this system, all of recorded contents of a target HDD whose firmware is to be updated is copied to a cache (or a spare disk device), the cache is controlled so as to form an array with the other disk devices, then a firmware stored in a spare disk device or the like is downloaded to the target HDD which is to be updated, and after completion of the download, the content of the target HDD is renewed with the data stored in the cache.

With this system, however, since it is required to copy all of the contents recorded in the target HDD to the cache before the firmware update, it takes an unnecessary time, and further, the cache needs to have the same capacity as that of the HDD.

As a problem of the traditional technique described above, in general, the operation of the target disk device is forced to be stopped temporarily for updating, and this has been a cause of deterioration of the operating capacity of the system and quality of service, which means, a stoppage of the disk array apparatus and an interruption of the service, and the like.

Meanwhile, there has been another traditional technique which enables a firmware to be downloaded to an HDD without stopping the operation of a disk array apparatus, in which the target HDD is disconnected, and a cache (or a disk device) is prepared as a substitution thereof. With this method, however, there has been operational constraint such that it is required to copy all of the contents recorded in the target HDD to be updated to the cache before the firmware update, thus time is wasted for this operation, and further, the cache needs to have a large capacity which is equivalent to the capacity of the HDD.

Japanese Unexamined Patent Publication 2002-318666 (Patent Document 2) discloses a technique with which firmware can be updated for a plurality of disk devices without stopping the operation of a disk array apparatus. Patent Document 2 discloses a configuration in which, written data in a target disk device whose firmware is to be updated are copied to a disk device other than the target disk device to be updated for saving, and when the firmware update of the target disk device is complete, the saved data are rewritten into the disk device whose firmware is updated.

With the technique disclosed in Patent Document 2, operation of the disk array apparatus is not required to be stopped, but it is necessary to save the data written in the target disk device whose firmware is to be updated by copying the data to a disk device other than the target disk device to be updated, and it takes a time for copying the data.

SUMMARY OF THE INVENTION

An exemplary object of this invention is to realize a disk array apparatus which can provide enhanced operating capacity and improved quality of service, configured such that a plurality of HDDs are arranged for providing redundancy, in which a firmware of an HDD can be updated even when the disk array apparatus is being in operation, without stopping the operation of the disk array apparatus, and an updating method therefore.

For solving the above described problems, a disk array apparatus according to this invention includes: a plurality of disk devices arranged for providing redundancy; a disk array control device for executing a data write command or a data read command issued from a host computer to each of the disk devices; and a disk controller for controlling each of the disk devices independently in response to a command issued from the disk array control device. The disk array control device includes: a firmware update controller for designating a target disk device to be updated based on a content of the firmware update command for the disk device and controlling a firmware update for the designated disk device; a degenerate state setting controller for temporarily disconnecting the disk device designated by the firmware update controller from the host computer and setting the disk device as being in a temporary degenerate state; and a write/read execution processor for, when a data write command or a data read command for the disk device being in the temporary degenerate state is issued from a host computer, designating a disk device other than the disk device being in the temporary degenerate state to make the command issued from the host computer be executed with using redundancy.

A firmware update method according to the invention is a method for updating firmware of a plurality of disk devices which are arranged for providing redundancy, the method includes: receiving a firmware update command issued from a maintenance console and determining a target disk device whose firmware is to be updated; disconnecting the disk device determined to be update target temporarily and managing the disk device as being in a temporary degenerate state; performing a data write operation or a data read operation from a host computer to a disk device which is other than the disk device being in the temporary degenerate state, by using redundancy, upon receiving the data write command or the data read command for the disk device being in the temporary degenerate state from the host computer; and, after a completion of the firmware update for the target disk device, writing the data, which are supposed to be written at being in the temporary degenerate state, into the target disk device whose firmware is updated.

A firmware update program product according to the invention is a program product for updating firmware of a plurality of disk devices which are arranged for providing redundancy, the program product causes a computer to execute functions of: receiving a firmware update command issued from a maintenance console and determining a target disk device whose firmware is to be updated; disconnecting the disk device determined to be an update target temporarily and managing the disk device as being in the temporary degenerate state; performing a data write operation or a data read operation from a host computer to a disk device which is other than the disk device being in the temporary degenerate state, by using redundancy, upon receiving the data write command or the data read command for the disk device being in the temporary degenerate state issued from the host computer, and, after a completion of the firmware update for the target disk device, writing the data which are supposed to be written at being in the temporary degenerate state into the target disk device whose firmware is updated.

DETAILED DESCRIPTION OF THE EXEMPLARY EMBODIMENTS

Figure 1:
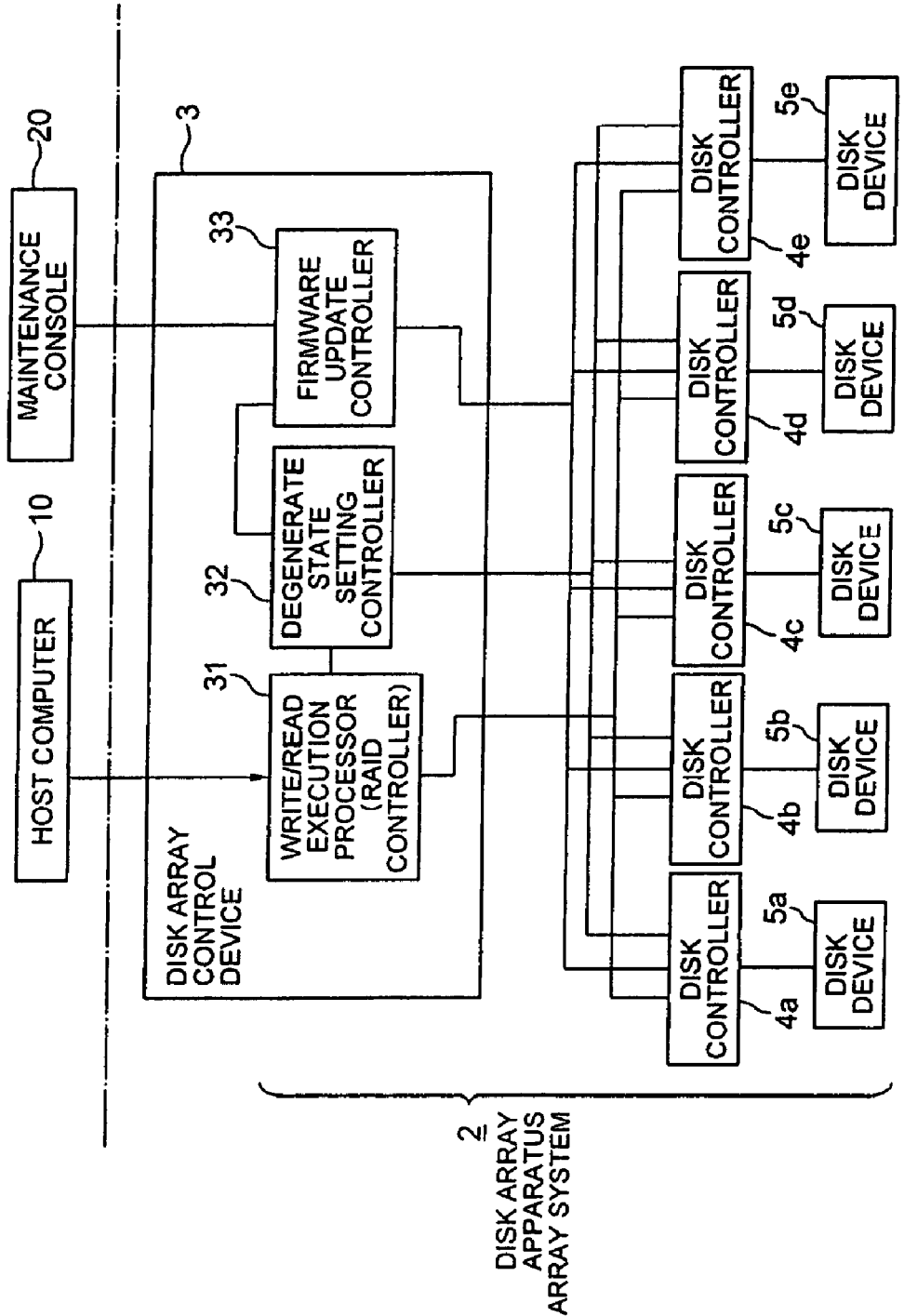
FIG. 1 is a block diagram showing a structure of a disk array apparatus according to an exemplary embodiment of the invention.
Figure 2:
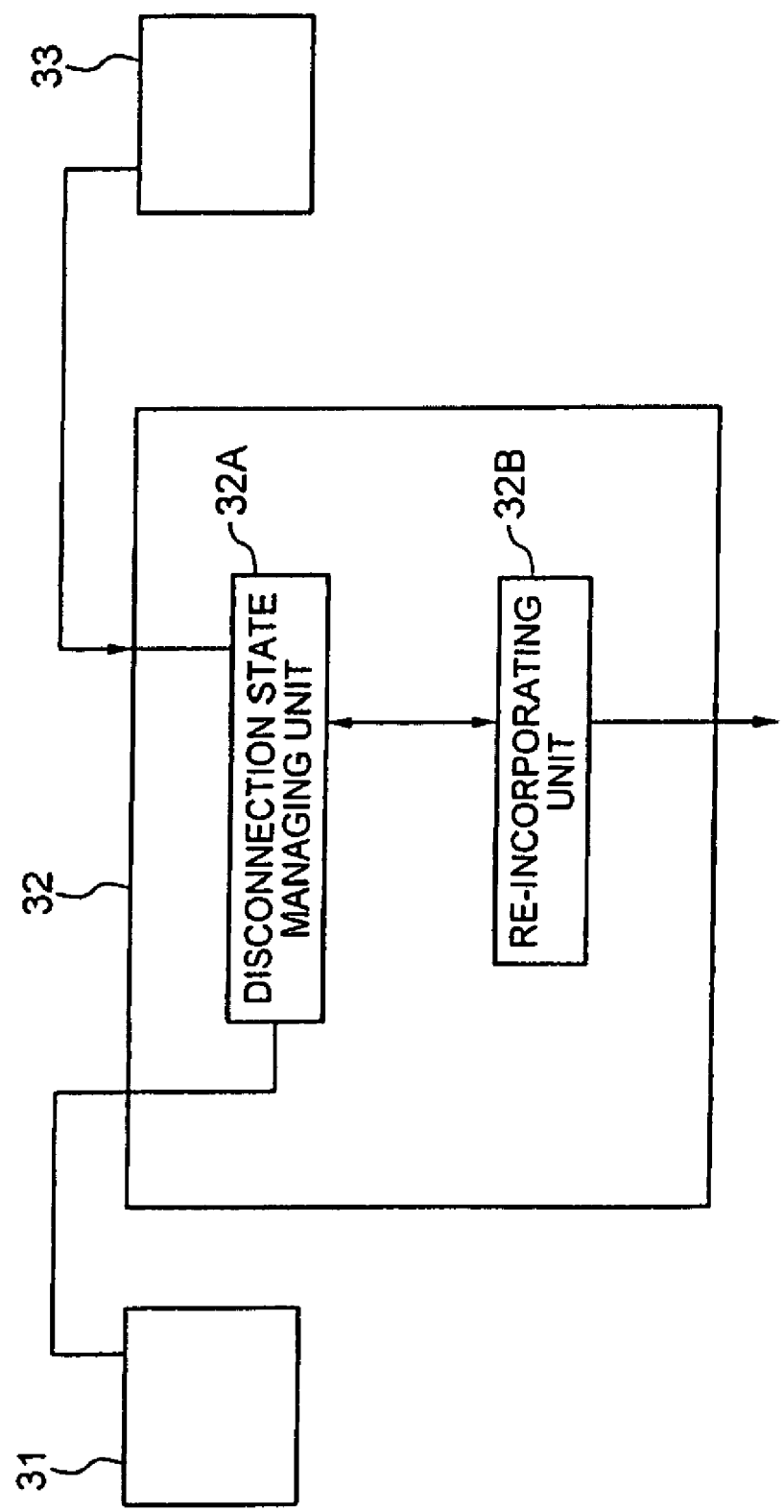
FIG. 2 is a block diagram showing a structure of a degenerate state setting controller in a disk array control device according to the exemplary embodiment of the invention.

Next, an exemplary embodiment of the invention will be described with reference to the drawings. FIG. 1 shows a configuration of a disk array apparatus according to an exemplary embodiment of the invention.

A disk array apparatus 2 according to an exemplary embodiment of the invention includes: a plurality of disk devices 5a to 5e arranged for providing redundancy, a disk array control device 3 for executing a data write command or a data read command issued from a host computer 10 to each of the disk devices 5a to 5e using a RAID system, and disk controllers 4a to 4e for controlling actions of the disk devices 5a to 5e independently in response to a command issued from the disk array control device 3. The disk array control device 3 includes: a firmware update controller 33, which functions upon receiving a firmware update command for any of the disk devices 5a to 5e from a maintenance console 20 which is provided separately in advance, for designating a target disk device to be updated (5a, for example) based on a content of the firmware update command; and a degenerate state setting controller 32 for disconnecting the disk device 5a which is designated by the firmware update controller 33 from the host computer 10 temporarily and setting the disk device 5a as being in a temporary degenerate state, in which the firmware update controller 33 includes a firmware update control function for updating the firmware of the disk device 5a which is set as being in a temporary degenerate state by the degenerate state setting controller 32, with an update firmware prepared in advance.

The disk array apparatus 2 according to the exemplary embodiment employs a so-called RAID-3 system as a redundant structure (a RAID system having a dedicated parity drive on the bit-by-bit basis or byte-by-byte basis), the disk devices 5a to 5d are arranged for providing redundancy, and the disk device 5e is a spare drive. Note that, although this exemplary embodiment is described as using five disk devices, the invention can apply to the case in which the numbers of the disk devices are three or more.

The disk array control device 3 includes the temporary degenerate state setting controller 32, the firmware update controller 33, and the write/read execution processor (RAID controller) 31 which operates in response to a data write command or a data read command for the disk device being in the temporary degenerate state issued from a host computer, for designating a disk device other than the disk device being in the temporary degenerate state to make the command issued from the host computer be executed with using redundancy of the disk devices.

The degenerate state setting controller 32 includes a disconnection state managing unit 32A for disconnecting the target disk device to be updated which is designated by an update target HDD determining unit 33B temporarily and managing the disk device with setting as being in the temporary degenerate state, and a re-incorporating unit 32B for incorporating the disk device into the disk array apparatus and clearing the temporary degenerate state after the completion of the firmware update of the target disk device.

Figure 3:
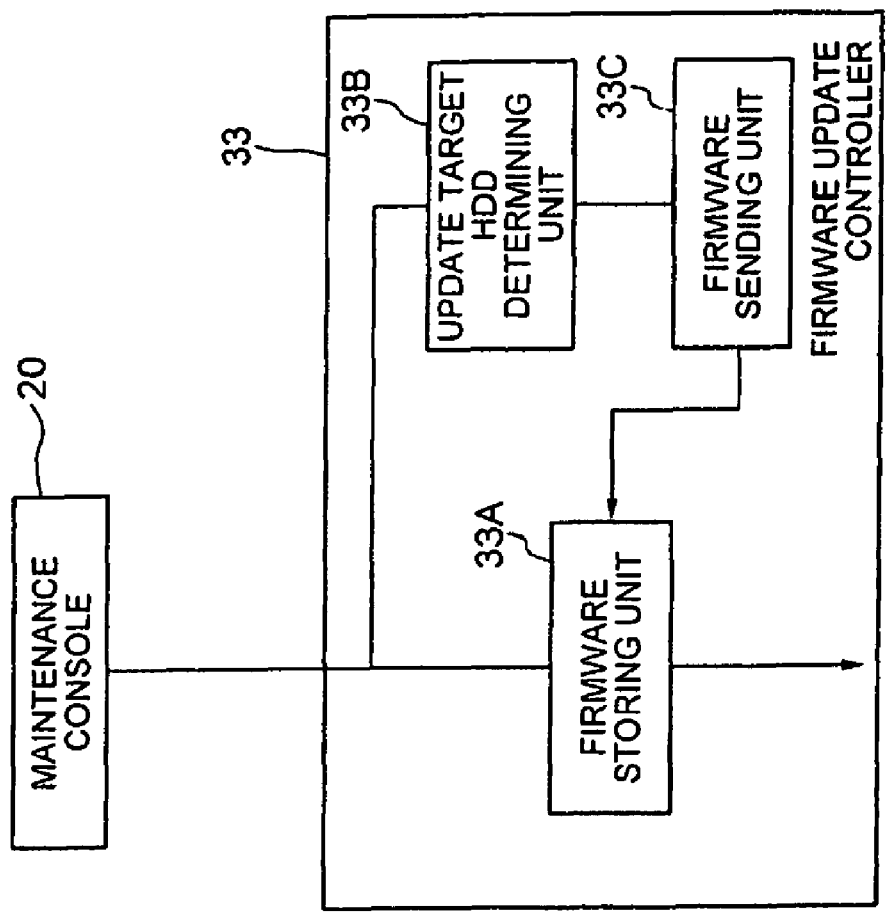
FIG. 3 is a block diagram showing a structure of a firmware update controller in the disk array control device according to the exemplary embodiment of the invention.
Figure 4:
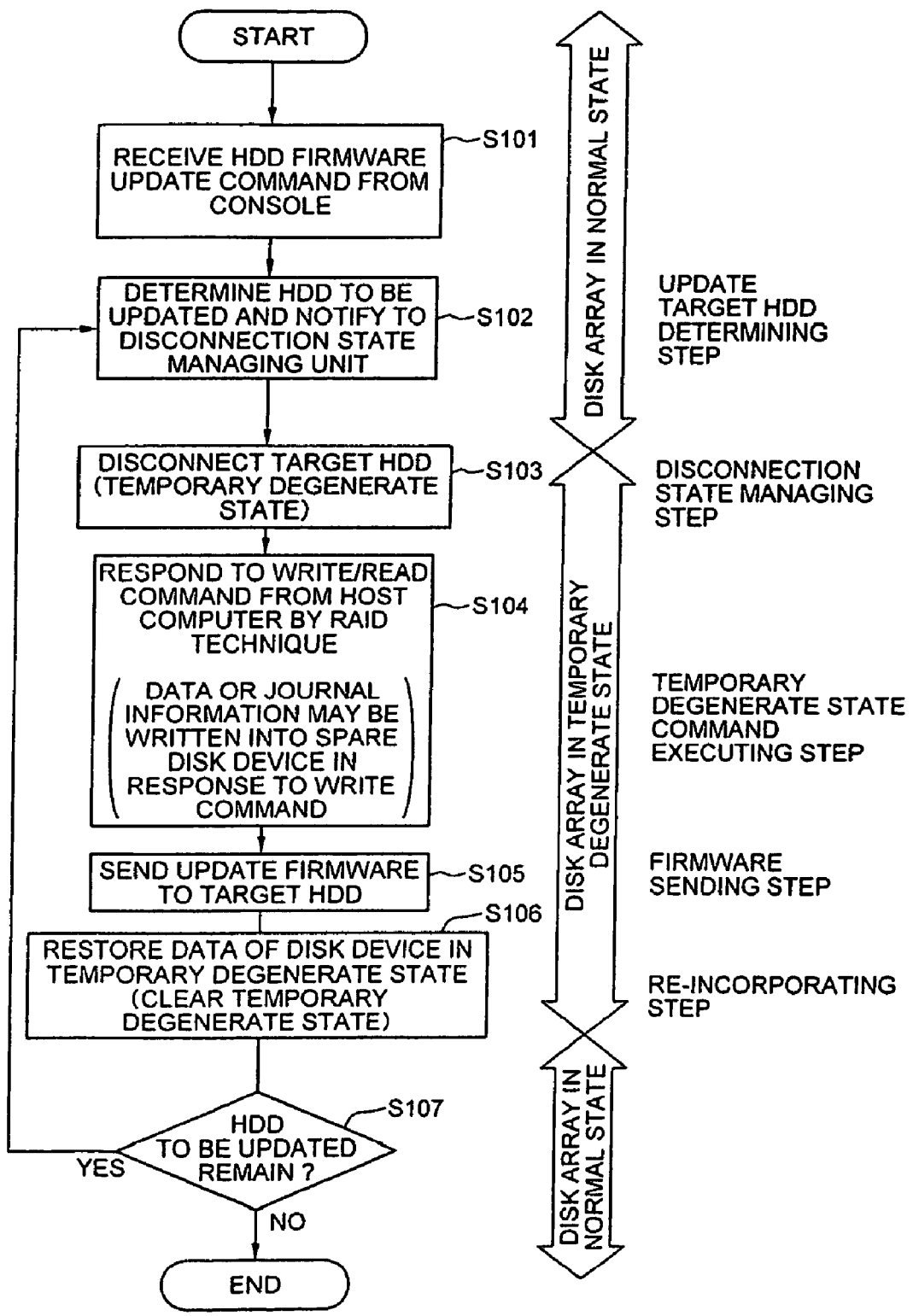
FIG. 4 is a flowchart showing firmware update operations of the disk array apparatus according to the exemplary embodiment of the invention.

The firmware update controller 33 includes the update target HDD determining unit 33B for receiving a firmware update command from a maintenance console 20 and determining and designating a target disk device to be updated based on a content of the firmware update command, a firmware storing unit 33A for storing an update firmware in advance, and the firmware sending unit 33C for sending the stored update firmware to the disk device designated by the update target HDD determining unit 33B, as shown in FIG. 3.

Here, the firmware update command is in a form with which a plurality of any target HDDs to be updated can be specified with setting an order of priority, or, without setting an order of priority. When the plurality of any target HDDs to be updated are specified with setting the order of priority in the firmware update command, the update target HDD determining unit 33B designates the target HDDs to be updated according to the order, and when specified without setting an order, the update target HDD determining unit 33B sets an order of the target HDDs to be updated automatically based on a predetermined rule. With this, since the plurality of the target HDDS to be updated can be designated at once, or the order of update can be set automatically with these techniques, it becomes possible to cope with a firmware update operation flexibly and easily, and the operating efficiency can be improved.

Next, an operation of the disk array apparatus according to an exemplary embodiment of the invention will be described with reference to FIGS. 1 to 4. Firstly, a normal operation of the disk array apparatus (when firmware is not to be updated) is described. The write/read execution processor 31 of the disk array control device 3 decodes a command received from the host computer 10, and when the command is a write command, the disk array control device 3 sends the data received from the host computer 10 to the disk controllers 4a to 4d in a distributing manner. Then, each of the disk controllers 4a to 4d writes the data into the corresponding disk devices 5a to 5d, respectively.

On the other hand, when a command received from the host computer 10 is a read command, each of the disk devices 5a to 5d, in which the data to be read out by the write/read execution processor 31 is written, sends the written data to the corresponding disk controllers 4a to 4d, respectively. The write/read execution processor 31 of the disk array control device 3 restores the pieces of data sent from the disk controllers 4a to 4d into one piece of data, and sends the data to the host computer 10.

Next, a firmware update operation is described. Here, described is a firmware update operation for updating firmware in all of the disk devices 5a to 5d, as an example. Note that, during the firmware update operation as described later being performed, write commands and read commands are issued sequentially from the host computer 10, and seen from the host computer 10, these commands appear to be processed as in the normal state, by the disk array apparatus as a whole.

Firstly, when an HDD firmware update command issued from the maintenance console 20 is received at the firmware update controller 33 (step S101), a target HDD to be updated is determined at the update target HDD determining unit 33B in the firmware update controller 33 based on the commands and the firmware information in the disk devices 5a to 5d (step S102, update target HDD determining step). In this case, when all of the HDDs of the disk devices 5a to 5d are recognized as targets to be updated for example, the update target HDD determining unit 33B issues an instruction to the disconnection state managing unit 32A of the degenerate state setting controller 32 to disconnect the disk device 5a at first.

The disconnection state managing unit 32A disconnects the designated disk device 5a from the devices which are operated by the disk array apparatus 2 temporarily, and set the disk device 5a as being in the temporary degenerate state (step S103, disconnection state managing step).

If a write command is issued from the host computer 10 during this time, the write/read execution processor 31 of the disk array control device 3 executes the write processing on the disk device 5b to 5d (step S104, temporary degenerate state command executing step). At this time, if a write command to write in the disconnected disk device 5a is issued, the processing is performed such that block addresses indicating positions on the disk device 5a corresponding to the written position of data in the disk devices 5b to 5d are stored in a storing unit (not shown) sequentially. At the same time, data which are supposed to be written into the disk device 5a may be written into a spare disk device 5e, or write command may be written into the spare disk device 5e with being journalized. Here, the "journal" means history information in which writing operations from the host computer 10 are arranged in order of time, to enhance a reliability for a file system to be changed.

As mentioned above, once the write command issued from the host computer 10 is stored in the spare disk device 5e (when the target disk is in the temporary degenerate state), the target disk device (disconnected disk device) whose firmware is updated can be re-incorporated in a shorter time, in a re-incorporation step described later, compared to the case in which disk devices 5b to 5d employing RAID technique are used. When there is a read command issued from the host computer 10, the write/read execution processor 31 of the disk array control device 3 executes the read processing on the disk device 5b to 5d.

When the disk device 5a is in the temporary degenerate state, the firmware sending unit 33C of the firmware download controller 33 reads out a firmware from the firmware storing unit 33A and writes the firmware into the disk device 5a (step S105, firmware sending step).

After the writing of the firmware is complete, if the write/read execution processor 31 of the disk array control device 3 had executed the write processing to the disk devices 5b to 5d during the temporary degenerate state, the re-incorporating unit 32B of the degenerate state setting controller 32 performs data restoration from the disk devices 5b to 5d based on the information about written positions stored in the storing unit (not shown) of the disk array control device 3 and writes the restored data in the disk device 5a, then clears the degenerate state and sets the disk device 5a in the normal state (step S106, re-incorporating step).

When there is a spare disk device 5e, the re-incorporating operation by the re-incorporating unit 32B of the degenerate state setting controller 32 may be performed in such a manner as reading the data which had been written in the spare disk device 5e at the temporary degenerate state command executing step and writing the date into the disk device 5a, or, restoring the content of the disk device 5a based on a journal information in which a write command is written with being journalized. With this method, the content of the write command which is issued from the host computer 10 when the disk device 5a is in the temporary degenerate state with being disconnected from the host computer 10, can be restored more quickly compared to the case in which the restoration is performed from the data written in the disk devices 5b to 5d employing the normal RAID technique without using the spare disk device 5e.

That is a sequence of actions in firmware update for the disk device 5a. Likewise, firmware updates for the disk devices 5b to 5d are sequentially performed with respect to the disk device 5b, the disk device 5c, and the disk device 5d with the same manner, then with clearing the temporary degenerate state after the completion of the restoration of the data written in the disk device 5d, all of the actions are complete.

While the embodiment is described such that the redundant configuration is a RAID-3, the invention is not limited to this embodiment, and applicable to the redundancy configurations such as RAID-1 to RAID-6.

With the disk array apparatus according to the exemplary embodiment having the configuration and action described above, it is possible to update the firmware of the HDD without stopping the operation of the disk array apparatus, by setting the update target HDD to be in the temporary degenerate state according to the firmware update command issued from the maintenance console. Thus, it is effective in improving the operating performance and the quality of service of the disk array apparatus. Further, by using the spare disk device 5e, there is a remarkable effect such that the content of the write command issued from the host computer 10 when the disk device 5a is in the temporary degenerate state can be restored more quickly compared to the case in which the content of the write command is restored from the data written in the disk devices 5b to 5d by the normal RAID technique without using the spare disk device 5e.

As an exemplary advantage according to the invention, it is possible to update a firmware of a HDD without stopping the operation of the disk array apparatus, and without copying the data stored in the target disk device whose firmware is to be updated to the other disk device, and further, it is effective in improving the operating performance and quality of service of the system.

A disk array apparatus according to another exemplary embodiment of the invention includes: a plurality of disk devices arranged for providing redundant; a disk array control device for executing a data write command or a data read command for each of the disk devices issued from a host computer; a disk controller, which activates in response to a command issued from the disk array control device, for controlling each operation of the disk devices independently. The disk array control device includes: a firmware update controller, which activates upon receiving a firmware update command for each of the disk devices from a maintenance console, for designating a target disk device to be updated based on a content of the firmware update command; a degenerate state setting controller for disconnecting the disk device designated by the firmware update controller from the host computer temporarily, and setting the disk device as being in a temporary degenerate state; a write/read execution processor which activates in response to the data write command or the data read command issued from a host computer for the disk device being in the temporary degenerate state, for designating a disk device other than the disk device being in the temporary degenerate state to execute the command issued from the host computer by using redundancy.

The firmware update controller includes a firmware update control function for updating the firmware of the disk device, which is set as being in a temporary degenerate state by the degenerate state setting controller, with an update firmware prepared in advance.

The disk array apparatus according to still another exemplary embodiment of the invention may be equipped with a spare disk device in addition to the disk devices other than the disk device being in the temporary degenerate state, and configured such that the write/read execution processor makes the data write operation from the host computer be performed with respect to the spare disk device, and after the completion of the firmware update, the data in the target disk device whose firmware is updated at the temporary degenerate state are renewed to the latest state based on the data written in the spare disk device.

The disk array apparatus according to still another exemplary embodiment of the invention may be equipped with a spare disk device in addition to the disk devices other than the disk device being in the temporary degenerate state, and configured such that the write/read execution processor makes the write processing of the journal information be performed with respect to the spare disk device when there is a data write command from the host computer, and after the completion of the firmware update, the data in the target disk device whose firmware is updated in the temporary degenerate state are restored to the latest state based on the journal information written in the spare disk device.

The disk array apparatus according to still another exemplary embodiment of the invention may be configured such that the firmware update controller includes the update target HDD determining unit for receiving a firmware update command from a maintenance console and determining and designating a target disk device to be updated based on a content of the firmware update command, a firmware storing unit for storing an update firmware in advance, and a firmware sending unit for sending the stored update firmware to the disk device designated by the update target HDD determining unit.

The disk array apparatus according to still another exemplary embodiment of the invention may be configured such that the degenerate state setting controller includes a disconnection state managing unit for disconnecting the update target disk device designated by the update target HDD determining unit temporarily and managing the disk device with setting as being in the temporary degenerate state, and a re-incorporating unit for incorporating the disk device into the disk array apparatus after the completion of the firmware update for the update target disk device and clearing the temporary degenerate state.

The disk array apparatus according to still another exemplary embodiment of the invention may be configured such that the firmware update command is in a form with which a plurality of any target disk devices to be updated can be specified with setting an order of priority, or, without setting an order of priority.

The disk array apparatus according to still another exemplary embodiment of the invention may be configured such that, when the plurality of any target disk devices to be updated are specified with setting the order of priority in the firmware update command, the update target HDD determining unit 33B designates the target disk devices to be updated according to the order, and when specified without setting an order, the update target HDD determining unit 33B sets an order of the target disk devices to be updated automatically based on a predetermined rule.

A firmware update method according to still another exemplary embodiment of the invention is a method of updating firmware of a disk device in a disk array apparatus including: a plurality of disk devices which are arranged to be redundant; a disk array control device for executing a data write command or a data read command issued from a host computer for each of the disk devices; and a disk controller, which activates in response to a command issued from the disk array control device, for controlling operation of each disk devices independently, and the method includes: an update target HDD determining step of receiving a firmware update command issued from a maintenance console and determining a target disk device whose firmware is to be updated; a disconnection state managing step of disconnecting the update target disk device being determined in the update target HDD determining step temporarily and managing the disk device as being in the temporary degenerate state, a temporary degenerate state command executing step of performing the data write operation or the data read operation from the host computer to a disk device other than the disk device being in the temporary degenerate state, by using redundancy, upon receiving the data write command or the data read command for the disk device being in the temporary degenerate state issued from the host computer, a firmware sending step of sending an update firmware stored in advance to the target disk device to be updated, and, after a completion of the firmware update for the target disk device, a re-incorporating step of restoring the data from the written data in the disk devices other than the target disk device at the temporary degenerate state, writing the data into the update target disk device for renewing the contents, and clearing the temporary degenerate state.

A firmware update method according to still another exemplary embodiment of the invention may be a method including, upon receiving the data write command from the host computer in the temporary degenerate state command executing step, performing the write operation of the data or journal information to the spare disk device which is provided in addition to the disk device other than the target disk device to be updated being in the temporary degenerate state, and renewing contents of the disk device, which is updated, by using the data or journal information of the spare disk device in the re-incorporating step.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A disk array apparatus comprising:
    a plurality of disk devices arranged for providing redundancy;
    a disk array control device for executing a data write command or a data read command issued from a host computer to each of the disk devices;
    a disk controller for controlling each of the disk devices independently in response to a command issued from the disk array control device; wherein the disk array control device comprises:
    a firmware update controller for designating a target disk device to be updated based on a content of a firmware update command for the disk device and controlling a firmware update for the designated disk device;
    a degenerate state setting controller for disconnecting the disk device designated by the firmware update controller from the host computer temporarily, and setting the disk device as being in a temporary degenerate state;
    a write/read execution processor for, when the data write command or the data read command for the disk device being in the temporary degenerate state is issued from the host computer, designating a disk device other than the disk device being in the temporary degenerate state to make a command issued from the host computer be performed with using redundancy of each disk device.

2. The disk array apparatus according to claim 1, wherein a spare disk device is provided, and the write/read execution processor writes the data, which are supposed to be written to the disk device being in the temporary degenerate state, into the spare disk device, and after the completion of the firmware update, the data in the disk device being at the temporary degenerate state are renewed to the latest state based on the data written in the spare disk device.

3. The disk array apparatus according to claim 1, wherein a spare disk device is provided, and the write/read execution processor writes the data, which are supposed to be written to the disk device being in the temporary degenerate state, into the spare disk device as the journal information, and after the completion of the firmware update, the data in the disk device being at the temporary degenerate state are renewed to a latest state based on the journal information written in the spare disk device.

4. The disk array apparatus according to claim 1, wherein the firmware update controller comprises:
    an update target HDD determining unit for receiving a firmware update command from a maintenance console and determining and designating the target disk device to be updated based on a content of the firmware update command;
    a firmware storing unit for storing an update firmware in advance; and
    a firmware sending unit for sending the stored update firmware to the disk device designated by the update target HDD determining unit.

5. The disk array apparatus according to claim 1, wherein the degenerate state setting controller comprises:
    a disconnection state managing unit for temporary disconnecting the target disk device to be updated designated by an update target HDD determining unit, and managing the disk device with setting as being in the temporary degenerate state; and
    a re-incorporating unit for incorporating the target disk device into the disk array apparatus after the completion of the firmware update of the target disk device, and clearing the temporary degenerate state.

6. The disk array apparatus according to claim 1, wherein the firmware update command is in a form with which a plurality of any target disk devices to be updated can be specified with setting an order of priority, or, without setting an order of priority.

7. The disk array apparatus according to claim 1, wherein, when the firmware update command specifies a plurality of any target disk devices to be updated with setting an order of priority, an update target HDD determining unit designates the target disk devices to be updated according to the order, and when specifies without setting an order of priority, the update target HDD determining unit sets the order of the target disk devices to be updated automatically based on a predetermined rule.

8. The disk array apparatus according to claim 1, wherein, the plurality of disk devices providing redundancy are configured to be a RAID system, and the write/read execution processor restores data which are supposed to be written to the target disk device whose firmware is to be updated, from data written in a disk device other than the target disk device, and writes the data into the target disk device whose firmware is updated.

9. A disk array apparatus comprising:
    a plurality of disk devices arranged for providing redundancy;
    a disk array control means for executing a data write command or a data read command issued from a host computer to each of the disk devices;
    a disk control means for controlling each of the disk devices independently in response to a command issued from the disk array control means; wherein
    the disk array control means comprises:
    a firmware update control means for designating a target disk device to be updated based on a content of the firmware update command for the disk device and controlling a firmware update for the designated disk device;
    a degenerate state setting control means for temporary disconnecting the disk device designated by the firmware update control means from the host computer, and setting the disk device as being in a temporary degenerate state;
    a write/read execution processing means for, when the data write command or the data read command for the disk device being in the temporary degenerate state is issued from the host computer, designating a disk device other than the disk device being in the temporary degenerate state to make a command issued from the host computer be performed with using redundancy of each disk device.

10. A firmware update method of updating firmware for a plurality of disk devices which are arranged for providing redundancy, the method comprising:
receiving a firmware update command issued from a maintenance console and determining a target disk device whose firmware is to be updated;
disconnecting the disk device being determined to be updated temporarily and managing the disk device as being in a temporary degenerate state;
performing a data write operation or a data read operation from a host computer to a disk device which is other than the disk device being in the temporary degenerate state, by using redundancy, upon receiving a data write command or a data read command from the host computer for the target disk device being in the temporary degenerate state; and
after a completion of the firmware update for the target disk device, writing the data which are supposed to be written at being in the temporary degenerate state into the target disk device whose firmware is updated.

11. A non-transitory computer-readable medium storing a firmware update program for updating firmware for a plurality of disk devices which are arranged for providing redundancy, the firmware update program causing a computer to execute functions of:
receiving a firmware update command issued from a maintenance console and determining a target disk device whose firmware is to be updated;
disconnecting the disk device determined to be the target disk device to be updated temporarily and managing the target disk device as being in a temporary degenerate state;
performing a data write operation or a data read operation from the host computer to a disk device which is other than the disk device being in the temporary degenerate state, by using redundancy, upon receiving a data write command or a data read command issued from the host computer for the target disk device being in the temporary degenerate state, and, after a completion of the firmware update for the target disk device, writing the data which are supposed to be written at being in the temporary degenerate state into the target disk device whose firmware is updated.

* * * * *